United States Patent
Chen et al.

(10) Patent No.: US 10,672,058 B2
(45) Date of Patent: Jun. 2, 2020

(54) SECRET SHARING WITH A TRUSTED INITIALIZER

(71) Applicant: Alibaba Group Holding Limited, George Town (KY)

(72) Inventors: Chaochao Chen, Hangzhou (CN); Jun Zhou, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/390,057

(22) Filed: Apr. 22, 2019

(65) Prior Publication Data

US 2020/0126143 A1    Apr. 23, 2020

Related U.S. Application Data

(63) Continuation of application No. PCT/CN2018/110700, filed on Oct. 17, 2018.

(51) Int. Cl.
G06Q 30/00    (2012.01)
G06Q 30/06    (2012.01)
(Continued)

(52) U.S. Cl.
CPC ..... *G06Q 30/0631* (2013.01); *G06F 21/6245* (2013.01); *G06Q 30/0623* (2013.01); *G06Q 50/01* (2013.01)

(58) Field of Classification Search
CPC .............................. G06Q 30/06–08
(Continued)

(56) References Cited

U.S. PATENT DOCUMENTS

2013/0031171 A1* 1/2013 Serena ............... G06Q 50/01
                                                     709/204
2015/0112838 A1* 4/2015 Li ..................... H04W 4/21
                                                     705/26.61

FOREIGN PATENT DOCUMENTS

KR    20130136401    12/2013
RU    2490713    8/2013
(Continued)

OTHER PUBLICATIONS

Dowsley, R., van de Graaf, J., Marques, D., and Nascimento, A. "A Two-Party Protocol with Trusted Initializer for Computing the Inner Product" (WISA 2010) http://cseweb.ucsd.edu/~rdowsley/pdf/DGMN10.pdf (image dated Apr. 7, 2015 downloaded from Wayback Machine) (Year: 2015).*

(Continued)

*Primary Examiner* — Ethan D Civan
(74) *Attorney, Agent, or Firm* — Fish & Richardson P.C.

(57) ABSTRACT

An item rating and recommendation platform identifies rating data comprising respective ratings of multiple items with respect to multiple users, identifies user-feature data comprising multiple user features contributing to the respective ratings of the multiple items with respect to the multiple users, and receives, from a social network platform via a secret sharing scheme with a trusted initializer, manipulated social network data computed based on social network data and first input data from the trusted initializer. The social network data indicate social relationships between any two of the multiple users. In the secret sharing scheme with the trusted initializer, the social network platform shares with the item rating and recommendation platform the manipulated social network data without disclosing the social network data. The item rating and recommendation platform
(Continued)

updates the user-feature data based on the rating data and the manipulated social network data.

20 Claims, 5 Drawing Sheets

(51) Int. Cl.
*G06F 21/62* (2013.01)
*G06Q 50/00* (2012.01)

(58) Field of Classification Search
USPC .................................................. 705/26.1–27.2
See application file for complete search history.

(56) References Cited

FOREIGN PATENT DOCUMENTS

| RU | 2649797 | 4/2018 |
|---|---|---|
| RU | 2666336 | 9/2018 |
| WO | WO 2017184029 | 10/2017 |
| WO | WO 2017200510 | 11/2017 |

OTHER PUBLICATIONS

Baike.Baidu.com [online], "Secret Sharing," Encyclopedia entry, last edited Aug. 10, 2018, [retrieved on May 6, 2019], retrieved from: URL<https://baike.baidu.com/item/%E7%A7%98%E5%AF%86%E5%85%B1%E4%BA%AB>, 4 pages (machine translation).
Chen et al., "Latent Factor Models for Web Recommender Systems," Yahoo! Research Presentation: UT Austin Data Mining Seminar Series, Nov. 22, 2010, 40 pages.
Extended European Search Report in European Application No. 18865363.8, dated Nov. 6, 2019, 9 pages.
Li et al., "Enforcing Differential Privacy for Shared Collaborative Filtering," IEEE Access, Feb. 2017, 5:35-49.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Wang et al., "VirtualIdentity: Privacy-Preseving User Profiling," IEEE/ACM International Conference on Advances in Social Networks Analysis and Mining, Aug. 2016, pp. 1431-1437.

* cited by examiner

SECRET SHARING WITH A TRUSTED INITIALIZER

CROSS-REFERENCE TO RELATED APPLICATIONS

This application is a continuation of PCT Application No. PCT/CN2018/110700, filed on Oct. 17, 2018, which is hereby incorporated by reference in its entirety.

BACKGROUND

With the development of technology and data analysis, many online platforms collect different types of data. For example, movie provider platforms collect rating data from the users, while social media platforms collect social network data from the users. These collected data are valuable and usually kept as private information by the respective platforms. The various platforms are paying more and more attention to data privacy and do not necessarily want to share their collected data, at least not in its original form.

SUMMARY

The present disclosure describes methods and systems for secret sharing with a trusted initializer, for example, between two platforms for providing social recommendations.

In an implementation, a computer-implemented method, including: identifying, by an item rating and recommendation platform, rating data including respective ratings of a number of items with respect to a number of users; identifying, by the item rating and recommendation platform, user-feature data including a number of user features contributing to the respective ratings of the number of items with respect to the number of users; receiving, from a social network platform by the item rating and recommendation platform via a secret sharing scheme with a trusted initializer, manipulated social network data computed based on social network data and first input data from the trusted initializer, wherein the social network data indicate social relationships between any two of the number of users, wherein, in the secret sharing scheme with the trusted initializer, the social network platform shares with the item rating and recommendation platform the manipulated social network data without disclosing the social network data; and updating, by the item rating and recommendation platform, the user-feature data based on the rating data and the manipulated social network data.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, the described techniques allow different platforms to securely collaborate in secret sharing without disclosing private or sensitive data, which encourages integration and collaboration among the platforms without compromising data privacy. Second, since much of the work can be done by various platforms before applying the secret sharing scheme, the described techniques allow for more efficient common development activities (such as, with respect to time, processor cycles, memory usage, and network bandwidth/congestion) or activities not supported by current online platforms. Third, the described techniques can provide improved recommendation models of the item rating and recommendation platforms and provide better-targeted recommendations (such as, a movie recommendation platform providing more targeted, relevant recommendations to users by leveraging obtained social network data from a social media platform). Other advantages will be apparent to those of ordinary skill in the art.

The details of one or more implementations of the subject matter of this specification are set forth in the Detailed Description, the claims, and the accompanying drawings. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
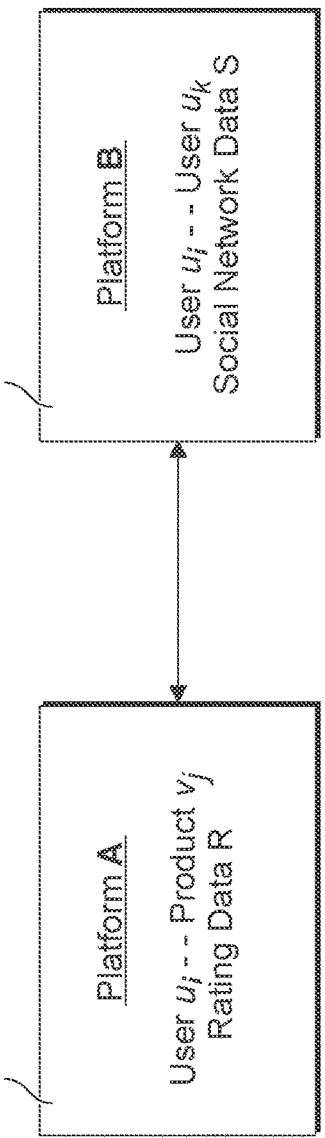
FIG. 1 is a block diagram illustrating an example system for secret sharing between platform A and platform B with a trusted initializer, according to an implementation of the present disclosure.

The following detailed description describes a secret sharing scheme with a trusted initializer, for example, between two platforms for providing recommendations to users based on social network data, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Among many online platforms, different platforms can accumulate different types of data. For example, an item rating and recommendation platform such as NETFLIX or IMDB accumulates rating data from users regarding movies and TV series. A social media or social network platform such as FACEBOOK or TWITTER accumulates social network data from the users and their friends. Social information can improve the performance of a recommendation system, as close friends tend to have similar preferences. The existing social based recommendation methods assume that the user rating data of an item and the social data between the users are shared. However, due to data privacy or other concerns, the online platforms typically do not share their original data with other parties.

Example techniques are described that allow platforms to securely collaborate in building an improved recommendation system based on both the rating data and the social network data, without disclosing each platform's private data to the other. For example, a social recommendation model can be trained based on both the rating data and the social network data via a secret sharing scheme between an item rating and recommendation platform and a social network platform. Under the secret sharing scheme, the data exchanged between the platforms are in a manipulated form, rather than their original form. The exchanged data are manipulated such that one cannot recover or decode the original data from the manipulated data.

The secret sharing scheme is different from encoding, encryption or other schemes for secured data transmission in which a data source (e.g., as a transmitter) encodes or encrypts original data into an encoded form before transmission, and an intended recipient can decode or recover the original data from the received encoded data, for example, based on a known security key or a corresponding decoding algorithm. The secret sharing scheme protects the original data from being known even by an intended recipient. As such, the data source can preserve the privacy of the original data.

The secret sharing scheme thus encourages collaboration between different platforms and can help achieve mutual benefits, without compromising data privacy. For example, with the disclosed secret sharing scheme, the item rating and recommendation platform can leverage social network information from the social network platform to better predict user's needs and provide targeted recommendations to users, resulting in enhanced user experience and potential profit returns to the item rating and recommendation platform.

FIG. 1 is a block diagram illustrating an example system 100 for secret sharing between platform A 102 and platform B 104, according to an implementation of the present disclosure. Platform A 102 can include, but is not limited to, an item rating and recommendation platform in entertainment, retail, service, and other industries or sectors where the users can rate products, services, or other items. Examples of an item rating and recommendation platform include, for example, AMAZON, NETFLIX, or IMDB. Platform A 102 can collect rating data R from its users. The rating data R can include one or more actual ratings of one or more items (e.g., products or services) given by the users, or one or more mapped ratings based on user's clicks, purchases, searches, or other historic activities with respect to the items. The ratings can reflect the user's needs, fondness, or preferences of the items. The ratings can have a specific range (e.g., [0, 1], or [1, 5]). In some implementations, the rating data R can be represented in a matrix having a dimension of M*N, where M represents the number of users and N represents the number of items, with entries $R_{ij}$ representing a rating of item j by user i.

Platform A 102 can also include user data, which can include, for example, user's names, ages, genders, addresses, or any other account or profile information, purchase histories, browsing histories, or search histories of the users at the platform A 102. Platform A 102 can also include item data, which can include, for example, names, categories, prices, keywords, instructions, etc., related to the items.

In some implementations, the collected rating data R can be a sparse matrix because only a small number (compared to M*N) of entries $R_{ij}$ having the actual rating or mapped rating based on existing user activities relative to the items. In some implementations, platform A 102 can predict known ratings of items so as to provide targeted recommendations of items to users. In some implementations, platform A 102 can predict known ratings of items, for example, based on the user data and the item data according to machine learning or statistics algorithms. As an example, platform A 102 can provide recommendations of items based on user-feature data U (also referred to as user factor data) and item-feature data V (also referred to as item factor data) according to matrix factorization methods or other techniques. Specifically, each user (e.g., user i) can be characterized by a vector (e.g., $U_i$) of user features such as age, gender, geo-location, visit pattern, etc. Each item (e.g., item j) can be characterized by a vector (e.g., $V_j$) of item features such as category, keywords, topics, prices, etc. The user features and item features can be factors that impact a given user's rating, selection, or purchase of a given item. In some implementations, a rating of an item given by a user can be approximated by a dot product of the vector of user features and the vector of item features. For example, $$R_{ij} \approx U_i^T V_j \qquad (1)$$

where $U_i$ represents a vector of the user-feature data corresponding to user i; $V_j$ represents a vector of the item-feature data corresponding to item j; and $R_{ij}$ represents a rating of item j by user i.

In some implementations, the user feature vector (e.g., $U_i$) and the item feature vector (e.g., $V_j$) are latent vectors which can be learned from training data (e.g., known rating data).

Platform B 104 can include, but is not limited to, a social media platform (such as, FACEBOOK, TWITTER, or INSTRAGRAM). Platform B 104 can collect social network data S from its users. The social network data can include, for example, names, ages, genders, addresses, jobs, relationships, hobbies, statuses, comments, blogs, browsing history, or other demographics, employment, recreational information of a user at the platform B and corresponding information of the user's friends, family, co-workers, etc. Such social network data S can be informative to platform A for predicting a user's rating of an item and providing recommendations.

For example, the platform A can predict user's ratings by solving an optimization problem as shown in formula (2):

$$\operatorname*{argmin}_{U_i, V_j} L = \sum_{u_i \in u, v_j \in v} (R_{ij} - U_i^T V_j)^2 + \qquad (2)$$

$$\lambda_1 \sum_{u_i, u_k \in u} S_{ik}(U_i - U_k)^2 + \lambda_2 \left( \left\| \sum_{u_i \in u} U_i \right\|^2 + \left\| \sum_{v_j \in v} V_i \right\|^2 \right)$$

where $S_{ik}$ represents a social relationship between user i and user k in the social network data S; $\lambda_1$ represents a predefined weight associated with the social network data; and $\lambda_2$ represents a predefined weight to prevent overfitting.

In this example, the objective function on the right hand side of the formula (2) includes 3 terms. The first term $\Sigma_{u_i \in u, v_j \in v}(R_{ij}-U_i^T V_j)^2$ represents the error or distance between the known rating data and the approximated rating computed based on the user-feature data (e.g., $U=[U_1, U_2, \ldots, U_M]$) and the item-feature data (e.g., $V=[V_1, V_2, \ldots, V_N]$). The second term $\lambda_1 \Sigma_{u_i, u_k \in u} S_{ik}(U_i-U_k)^2$ represents the effects of social network data S on the user feature vectors. For example, the closer or stronger social relationship of two users, the more similar the two users-feature vectors. In some implementations, the larger $S_{ik}$, the closer or stronger social relationship of two users. The third term $$\lambda_2 \left( \left\| \sum_{u_i \in u} U_i \right\|^2 + \left\| \sum_{v_j \in v} V_i \right\|^2 \right)$$

is used to prevent overfitting. The values of weights $\lambda_1$ and $\lambda_2$ can be pre-determined. The larger the weight, the more impact of a corresponding term on the objective function.

The above optimization problem to minimize the objective function can be solved, for example, by gradient descent or another algorithm. For example, taking derivative of the latent vectors U and V with respect to formula (2) and expressing the results in a matrix form can arrive at the below two equations:

$$\frac{\partial L}{\partial U} = (UV-R)V + 2\lambda_1 U \cdot \text{diag}(S \cdot I_M) + 2\lambda_1 U \cdot S + \lambda_2 U \quad (3)$$

$$\frac{\partial L}{\partial V} = (UV-R)U + \lambda_2 V \quad (4)$$

To solve for U and V in the above equations (3) and (4), results of matrix products $U \cdot \text{diag}(S \cdot I_M)$ and $U \cdot S$ suffice, without the need to know values of U and S individually. As such, a secret sharing scheme can be used by the platforms A and B to obtain the results of matrix products $U \cdot \text{diag}(S \cdot I_M)$ and $U \cdot S$. Under the secret sharing scheme, the platform A can disclose the manipulated U to the platform B without disclosing the original U to the platform B; and the platform B can disclose the manipulated S to the platform A without disclosing the original S to the platform A.

In some implementations, the secret sharing scheme can be implemented with or without a trust initializer. With a trust initializer, a common initial point can be established by the trust initializer and sent to the two platforms to assist their data exchange. Without a trust initializer, the two platforms can each generate random numbers as their respective initial points to assist their data exchange. The platforms could benefit from collaboration without sharing sensitive private information.

Figure 2:
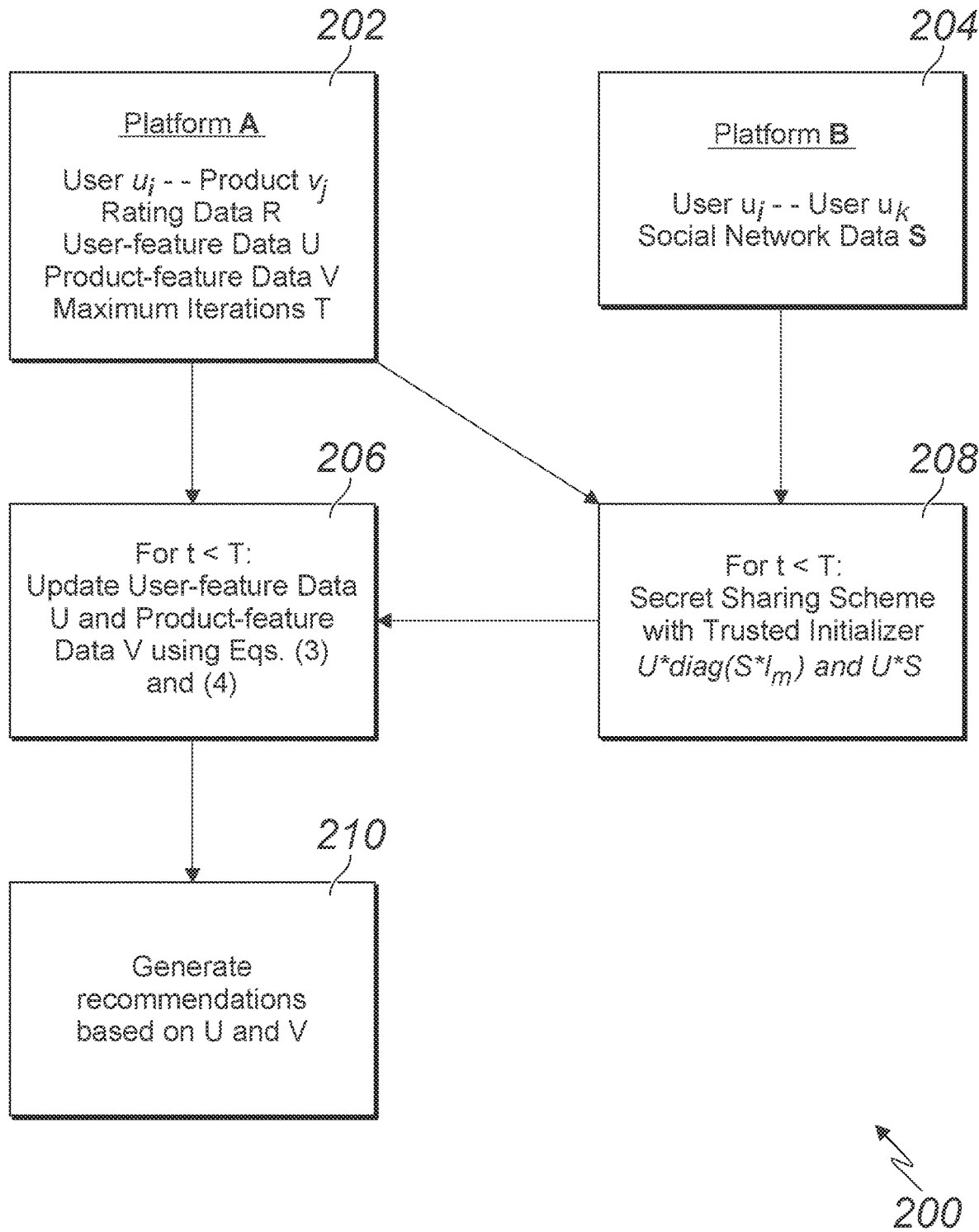
FIG. 2 is a flowchart illustrating an example secret sharing method between platform A and platform B with a trusted initializer for generating recommendations by platform A, according to an implementation of the present disclosure.

FIG. 2 is a flowchart illustrating an example secret sharing method 200 between platform A and platform B with a trusted initializer for generating recommendations by platform A, according to an implementation of the present disclosure. The platform A can be the platform A described in FIG. 1, and platform B can be the platform B described in FIG. 1. In some implementations, the example secret sharing method can be implemented in an iterative algorithm. The number of iterations T can be, for example, a pre-determined value or determined based on certain criteria (e.g., whether the algorithm converges or updates or differences of U or V after different iterations are below a threshold). At 202, the platform A identifies user rating data R and initial user-feature data U and item-feature data V, and the number of iterations T. At 204, the platform B identifies the social network data S. For a t-th iteration (t<T), at 208, the platform A and platform B can perform a secret sharing scheme with a trusted initializer to obtain the matrix products $U \cdot \text{diag}(S \cdot I_M)$ and $U \cdot S$. At 206, the platform A updates the U or V based on the matrix products $U \cdot \text{diag}(S \cdot I_M)$ and $U \cdot S$, for example, according to Equations (3) and (4). After T iterations, at 210, the platform A item-feature generates recommendations based on the updated user-feature data U and item-feature data V.

In some implementations, let matrix Z as a product of matrix A and matrix B. That is $Z=A \cdot B$. $Z_{ij}$ represents the entry/element of Z in the i-th row and j-th column. $Z_{1j}$ can be computed, for example, according to Equation (5). The matrix products $U \cdot \text{diag}(S \cdot I_M)$ and $U \cdot S$, For example, $$Z_{ij} \approx A_i^T B_j \quad (5)$$

where $A_i^T$ represents the i-th row of matrix A, and $B_j$ represent the j-th column of matrix B.

Figure 3:
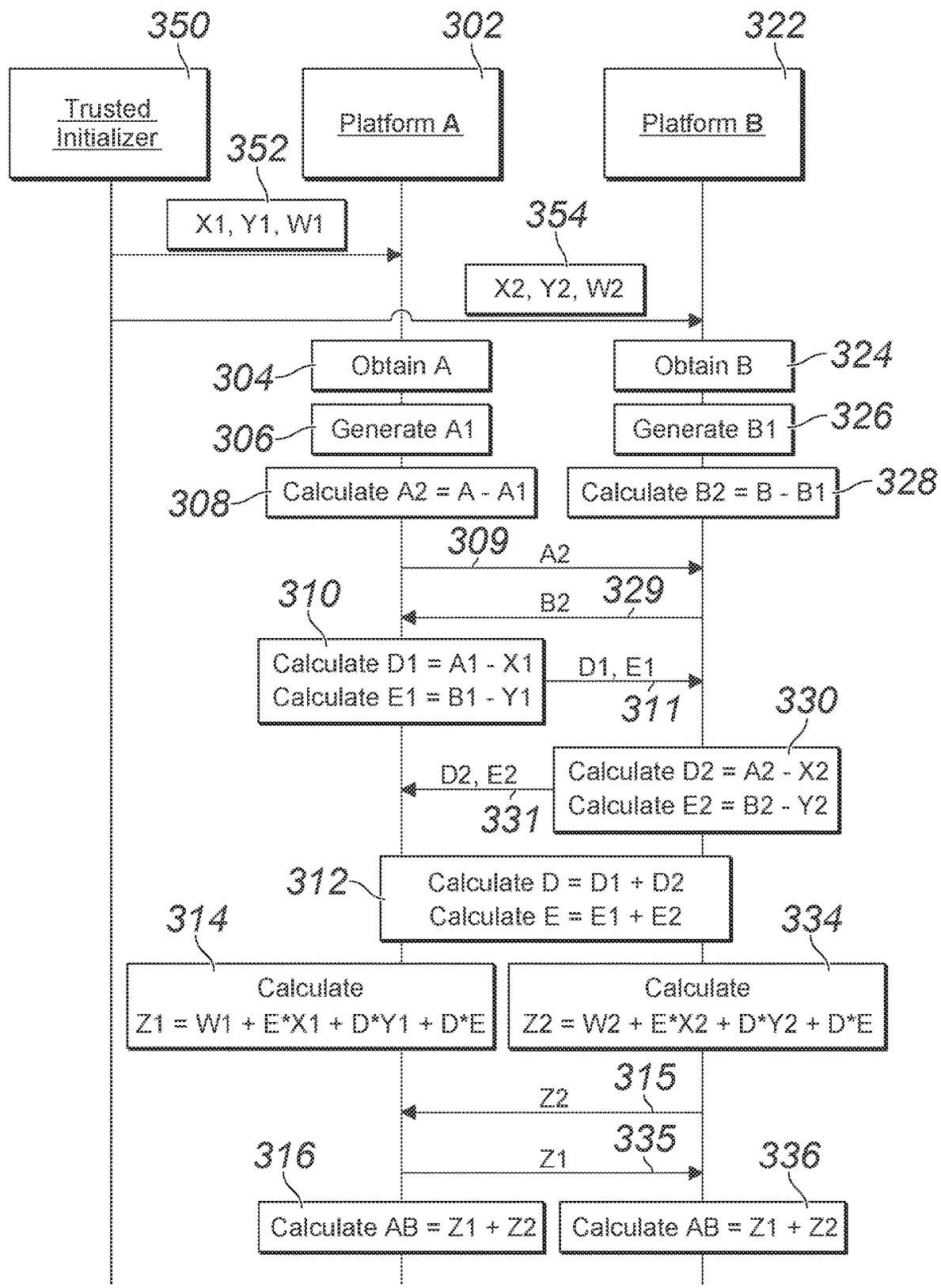
FIG. 3 is a flowchart illustrating an example secret sharing method between platform A and platform B for computing a matrix product Z of matrix A and matrix B using a secret sharing scheme with a trust initializer, according to an implementation of the present disclosure.

FIG. 3 is a flowchart illustrating the computation of a matrix product Z of matrices A and B using a secret sharing scheme between platform A 302 and platform B 322 with a trusted initializer 350, according to an implementation of the present disclosure. In a secret sharing scheme with a trusted initializer, the trust initializer 350 sends the initial values (X1, Y1, W1) 352 to platform A 302 and sends the initial values (X2, Y2, W2) 354 to platform B 322. The initial values for both platform A and platform B can be random values or predetermined values. At 304 and 324, both platform A 302 and platform B 322 obtain respective input A and input B. The input A 304 includes, but is not limited to, randomized input data or predetermined input data (e.g., user feature data U), and the input B 324 includes, but is not limited to, randomized input data or predetermined input social network data (e.g., social network data $\text{diag}(S \cdot I_M)$ or S).

After both platforms obtain the input data, platform A 302 generates a random matrix A1 at 306 and platform B 322 generates random matrix B1 at 326. At 308, the obtained input A 304 and random matrix A1 306 are used to compute for A2 such that A2=A−A1. At 309, A2 is sent to platform B 322 for computation without disclosing the original data A. A2 is sent to the platform B 322. At 328, the input B 324 and random matrix B1 326 are used to compute for B2 such that B2=B−B1. At 329, B2 is sent to platform A 302 for computation without disclosing the original data B. At 310, platform A 302 calculates for D1 using A1 and X1 such that D1=A1−X1 and calculates for E1 using B1 and Y1 such that E1=B1−Y1. On the other hand, at 330, platform B 322 calculates for D2 using A2 and X2 such that D2=A2−X2 and calculated for E2 using B2 and Y2 such that E2=B2−Y2. At 311, platform A 302 sends D1 and E1 to platform B 322. At 331, platform B 322 sends D2 and E2 to platform A 302. At 312, both platforms A and B can calculate for D using D1 and D2 such that D=D1+D2 and calculates for E using E1 and E2 such that E=E1+E2. With the computed D and E, both platforms A and B can generate outputs that can be used for updating the user-feature data and the item-feature data. For example, for generating the outputs, at 314, platform A 302 calculates for Z1 by W1+E*X1+D*Y1+D*E, where * denotes multiplication. At 334, platform B 322 calculates for Z2 by W2+E*X2+D*Y2+D*E, where * denotes multiplication.

At 315, platform A can receive Z2 from platform B. In some implementations, Z2 is an example manipulated social network data computed based on social network data (e.g., B) and first input data from the trusted initializer (e.g., X2, Y2, W2). At 335, platform B can receive Z1 from platform A. In some implementations, Z1 is an example manipulated user feature data computed based on user feature data (e.g., A) and second input data from the trusted initializer (e.g., X1, Y1, W1). The sum of Z1 and Z2 is equal to the product of matrices A and B. That is, AB=Z1+Z2. As such, at 316, platform A can compute a product of matrices A and B by computing a sum of Z1 and Z2, which are the manipulated data of the matrix A and the matrix B. Similarly, platform B can also compute the product of matrices A and B by computing a sum of Z1 and Z2.

By substituting matrix U with A, and substituting diag (S·$I_M$) with B, the matrix product S·diag(S·$I_M$) can be obtained. Similarly, by substituting matrix U with A, and substituting S with B, the matrix product U·S can be obtained. With the matrix products U·diag(S·$I_M$) and U·S, platform A can update the user-feature data U and item-feature data V, for example, according to Equations (3) and (4) as described with respect to 206 in FIG. 2.

The computations described in FIG. 3 provide example method of updating the user-feature data and the item-feature data. Based on the updated user-feature data and item-feature data, platform A 302 can generate predicted rating data. In some implementations, platform A 302 can, among other things, generate recommendations for a particular item for a particular customer based on the predicted rating data.

Figure 4:
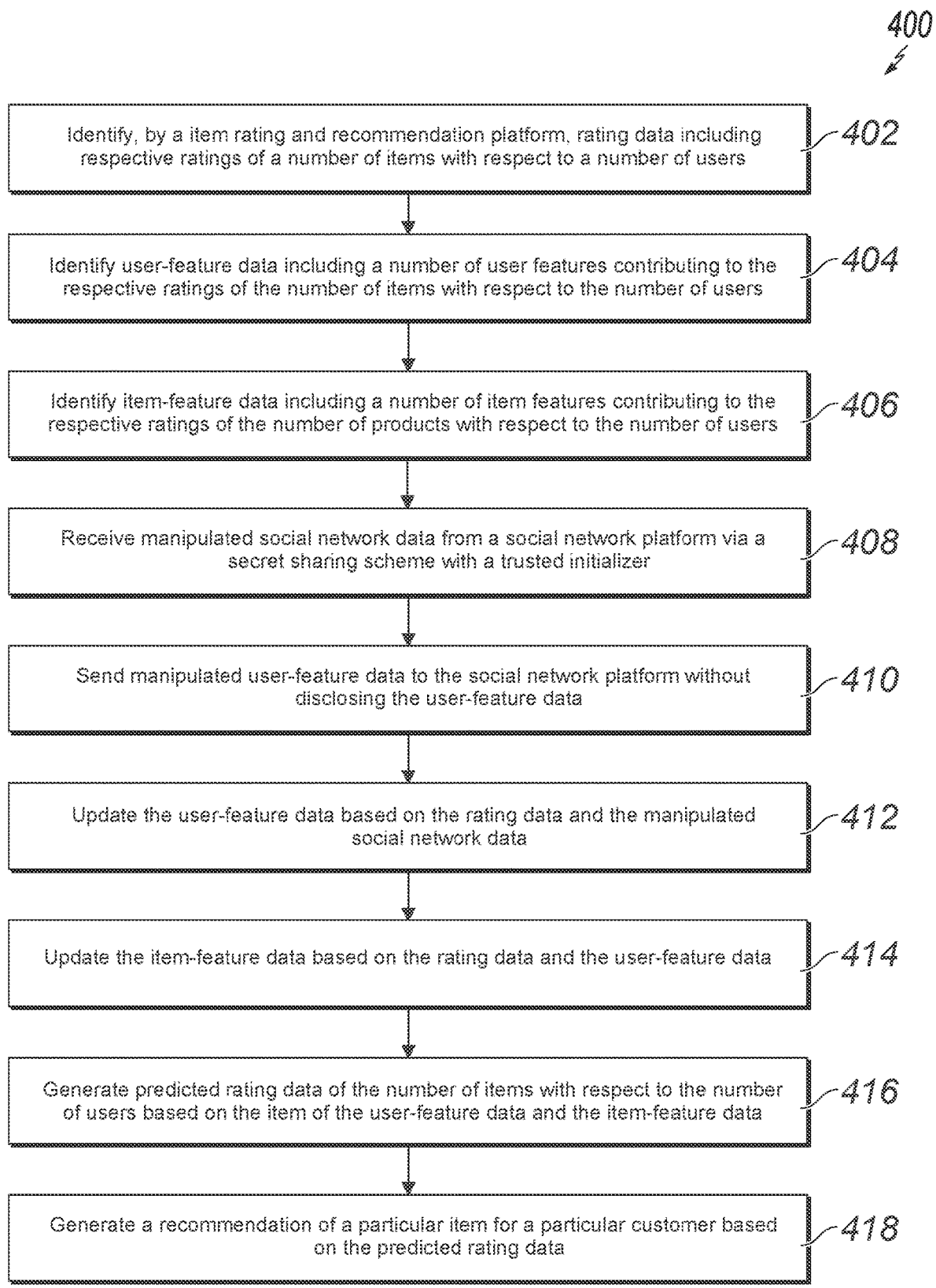
FIG. 4 is a flowchart illustrating an example method for generating a recommendation by an item rating and recommendation platform using a secret sharing scheme with a trusted initializer, according to an implementation of the present disclosure.

FIG. 4 is a flowchart of an example method 400 for generating a recommendation to a user by an item rating and recommendation platform using a secret sharing scheme with a trusted initializer, according to an implementation. For clarity of presentation, the description that follows generally describes method 400 in the context of the other figures in this description. For example, the item rating and recommendation platform can be platform A as described with respect to FIGS. 1-3. However, it will be understood that method 400 may be performed, for example, by any suitable system, environment, software, and hardware, or a combination of systems, environments, software, and hardware, as appropriate. In some implementations, various steps of method 400 can be run in parallel, in combination, in loops, or in any order.

At 402, rating data including, but not limited to, respective ratings of a number of items with respect to a number of users is identified by the item rating and recommendation platform. Identifying the rating data includes receiving (e.g., from another device), retrieving or loading from a memory, or determining the rating data based on one or more inputs to method 400. The rating data can include rating data R described with respect to FIGS. 1-3. For example, the rating data can include actual ratings or mapped ratings based on existing user activities relative to the items. From 402, method 400 proceeds to 404.

At 404, user-feature data including a number of user features contributing to the respective ratings of the number of items with respect to the number of users are identified by the item rating and recommendation platform. Identifying the user-feature data includes receiving (e.g., from another device), retrieving or loading from a memory, or determining the user-feature data based on one or more inputs to method 400. The rating data can include user-feature data U described with respect to FIGS. 1-3. From 404, method 400 proceeds to 406.

At 406, item-feature data including a number of item features contributing to the respective ratings of the number of items with respect to the number of users are identified by the item rating and recommendation platform. Identifying the item-feature data includes receiving (e.g., from another device), retrieving or loading from a memory, or determining the item-feature data based on one or more inputs to method 400. The rating data can include item-feature data V described with respect to FIGS. 1-3. From 406, method 400 proceeds to 408.

At 408, the item rating and recommendation platform receives manipulated social network data from a social network platform via a secret sharing scheme with a trusted initializer from a social network platform. In some implementations, the manipulated social network data can be computed based on social network data and first input data from the trusted initializer. The social network data indicate social relationships between any two of the number of users. In the secret sharing scheme with the trusted initializer, the social network platform shares with the item rating and recommendation platform the manipulated social network data without disclosing the social network data. In some implementations, in the secret sharing scheme with the trusted initializer, the item rating and recommendation platform shares with the social network platform manipulated user-feature data (e.g., Z2 as described with respect to FIG. 3) without disclosing the user-feature data (e.g., A), where the manipulated user-feature data are computed based on the user-feature data and first input data from the trusted initializer (e.g., X2, Y2, W2). In some implementations, the manipulated social network data are manipulated such that one cannot recover the original social network data from the manipulated social network data.

In some implementations, the secret sharing scheme with the trusted initializer is used for solving an optimization problem as described with respect to formula (2) as described with respect to FIG. 3. For example, in the secret sharing scheme with the trusted initializer, the item rating and recommendation platform obtains the second input data from the trusted initializer (e.g., X1, Y1, W1) and generates first manipulated user-feature data (e.g., A1) based on the user-feature data (e.g., A) and the second input data from the trusted initializer. The item rating and recommendation platform transmits to the social network platform first manipulated user-feature data (e.g., A2) and receives from the social network platform, first manipulated social network data (e.g., B2) computed based on the social network data (e.g., A) and first input data (e.g., X2, Y2, W2) from the trusted initializer. The item rating and recommendation platform can generate a number of intermediate data (e.g., D1, E1) based on two or more of the first manipulated user-feature data (e.g., A2), the first manipulated social network data (e.g., B2), or the second input data (e.g., X1, Y1, W1) from the trusted initializer. The item rating and recommendation platform can transmit to the social network platform the number of intermediate data and receive from the social network platform, a number of intermediate social network data (e.g., D2, E2) computed based on two or more of the first manipulated user-feature data (e.g., A2), the first manipulated social network data (e.g., B2), or the first input data from the trusted initializer (e.g., X1, Y1, W1). The item rating and recommendation platform can generate the manipulated user-feature data (e.g., Z1) based on two or more of the number of intermediate data (e.g., D1, E1), the plurality of intermediate social network data (e.g., D2, E2), or the second input data from the trusted initializer (e.g., X1, Y1, W1). Similarly, the social network platform can generate the manipulated social network data (e.g., Z2) based on two or more of the number of intermediate data (e.g., D1, E1), the plurality of intermediate social network data (e.g., D2, E2), or the first input data from the trusted initializer (e.g., X2, Y2, W2). From 408, method 400 proceeds to 410.

At 410, the item rating and recommendation platform sends manipulated user-feature data to the social network platform without disclosing the user-feature data. In some implementations, the manipulated user-feature data can include, for example, Z1 as described with respect to FIG. 3. From 410, method 400 proceeds to 412.

At 412, the item rating and recommendation platform updates the user-feature data based on the rating data and the manipulated social network data. In some implementations, updating the user-feature data includes computing a product of the user-feature data (e.g., U) and the social network data (e.g., S or diag($S \cdot I_M$)) by computing a sum of the manipulated user-feature data and the manipulated social network data. In some implementations, the user-feature data includes solving an optimization problem to minimize a weighted sum of a difference between the predicted rating data and the rating data, the user-feature data weighted by the social network data, and an overfitting-preventing term, for example, as shown in formula (2). In some implementations, updating the user-feature data includes updating the user-feature data according to the example techniques described with respect to FIG. 3. From 412, method 400 proceeds to 414.

At 414, the item rating and recommendation platform updates item-feature data based on the rating data and the user-feature data, for example, according to the example techniques described with respect to FIG. 3. For example, updating the user-feature data can include computing a product of the user-feature data (e.g., A) and the social network data (e.g., A) by computing a sum of the manipulated user-feature data (e.g., Z1) and the manipulated social network data (e.g., Z2). From 414, method 400 proceeds to 416.

At 416, predicted rating data of the number of items with respect to the number of users based on the product of the user-feature data and the item-feature data are generated. In some implementations, the predicted rating data can be generated, for example, based on the product of the user-feature data and the item-feature data according to equation (1). In some implementations, the generated rating can be better aligned with the users' needs or preferences because of the incorporation of the social network. From 416, method 400 proceeds to 418.

At 418, a recommendation of a particular item for a particular user based on the predicted rating data is generated. In some implementations, one or more items with top predicted ratings with respect to the particular user can be recommended to the particular user. The recommendation of a particular item can be a recommendation of a movie or a shopping item. For example, NETFLIX can better recommend a movie or AMAZON can better recommend an item based on the social network data. In some implementations, the recommendation of the particular item for the particular item can be output, for example, via a user interface (UI). In some implementations, the selected topics can be displayed in a chat box, a pop window, etc. in a graphic user interface (GUI) or other UIs for the user's review and consideration. From 418, method 400 stops.

Figure 5:
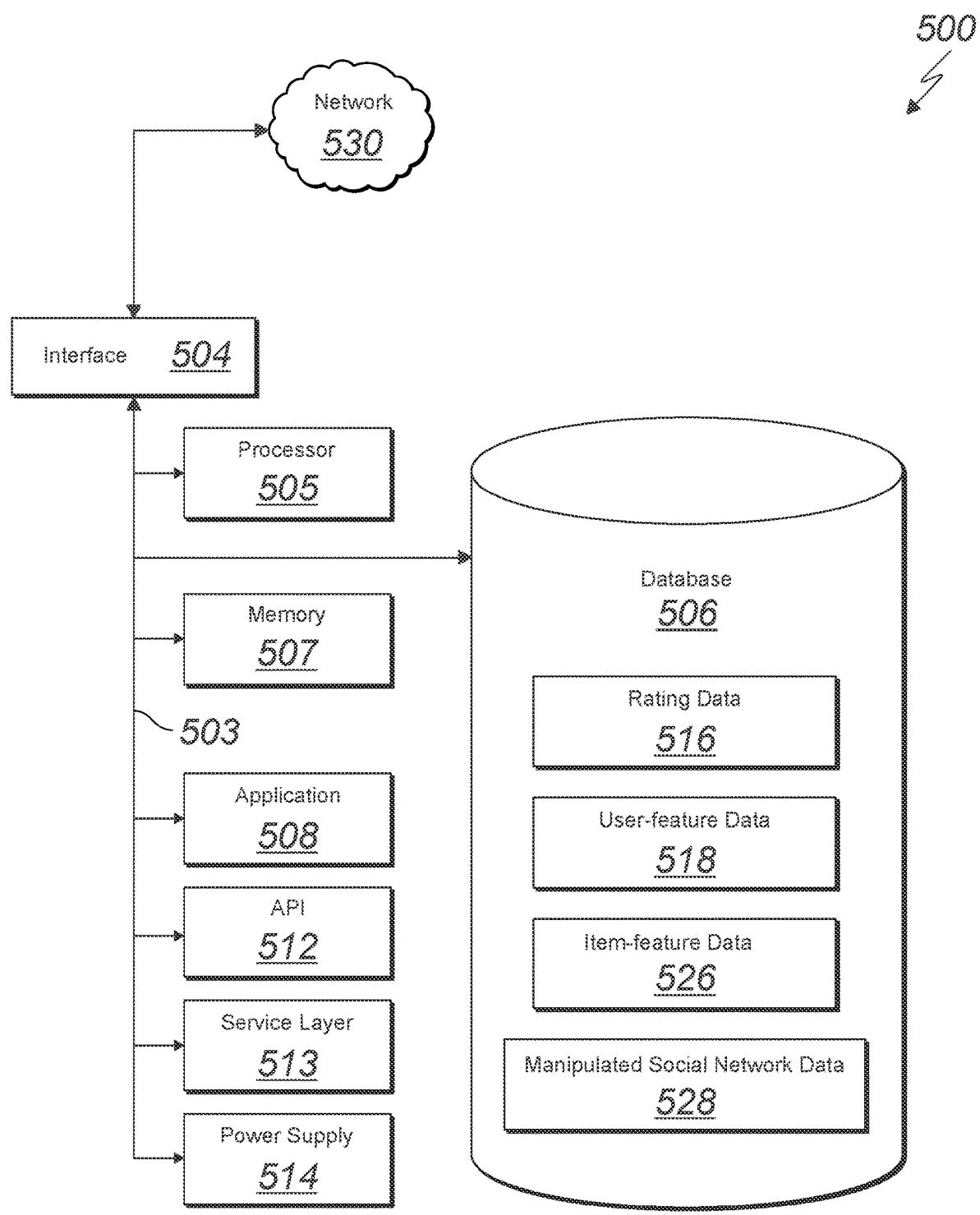
FIG. 5 is a block diagram illustrating an example computer system used to provide computational functionalities associated with described algorithms, methods, functions, processes, flows, and procedures as described in the instant disclosure, according to an implementation of the present disclosure.

FIG. 5 is a block diagram of an example computer system 500 used to provide computational functionalities associated with described algorithms, methods, functions, processes, flows, and procedures, as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 502 may include a computer that includes an input device, such as a keypad, keyboard, touch screen, or other device that can accept user information, and an output device that conveys information associated with the operation of the computer 502, including digital data, visual, or audio information (or a combination of information), or a graphical-type user interface (UI) (or GUI).

The computer 502 can serve in a role as a client, network component, a server, a database or other persistency, or any other component (or a combination of roles) of a computer system for performing the subject matter described in this disclosure. The illustrated computer 502 is communicably coupled with a network 530. In some implementations, one or more components of the computer 502 may be configured to operate within environments, including cloud-computing-based, local, global, or other environments (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, or other servers (or a combination of servers).

The computer 502 can receive requests over network 530 from a client application (for example, executing on another computer 502) and respond to the received requests by processing the received requests using an appropriate software application(s). In addition, requests may also be sent to the computer 502 from internal users (for example, from a command console or by other appropriate access methods), external or third parties, other automated applications, as well as any other appropriate entities, individuals, systems, or computers.

Each of the components of the computer 502 can communicate using a system bus 503. In some implementations, any or all of the components of the computer 502, hardware or software (or a combination of both hardware and software), may interface with each other or the interface 504 (or a combination of both), over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable languages providing data in extensible markup language (XML) format or other suitable formats. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems that are connected to the network 530 (whether illustrated or not) in a distributed environment. Generally, the interface 504 includes logic encoded in software or hardware (or a combination of software and hardware) and is operable to communicate with the network 530. More specifically, the interface 504 may include software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502. As illustrated, the database 506 holds previously described rating data 516, user-feature data 518, item-feature data 526 and social network data 528.

The computer 502 also includes a memory 507 that can hold data for the computer 502 or other components (or a combination of both) that can be connected to the network 530 (whether illustrated or not). Memory 507 can store any data consistent with this disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, or applications. Further, although illustrated as a single application 508, the application 508 may be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or other power management functionality). In some implementations, the power-supply 514 can include a power plug to allow the computer 502 to be plugged into a wall socket or other power source to, for example, power the computer 502 or recharge a rechargeable battery.

There may be any number of computers 502 associated with, or external to, a computer system containing computer 502, each computer 502 communicating over network 530. Further, the term "client," "user," and other appropriate terminology may be used interchangeably, as appropriate, without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, a computer-implemented method, including: identifying, by an item rating and recommendation platform, rating data including respective ratings of a number of items with respect to a number of users; identifying, by the item rating and recommendation platform, user-feature data including a number of user features contributing to the respective ratings of the number of items with respect to the number of users; receiving, from a social network platform by the item rating and recommendation platform via a secret sharing scheme with a trusted initializer, manipulated social network data computed based on social network data and first input data from the trusted initializer, wherein the social network data indicate social relationships between any two of the number of users, wherein, in the secret sharing scheme with the trusted initializer, the social network platform shares with the item rating and recommendation platform the manipulated social network data without disclosing the social network data; and updating, by the item rating and recommendation platform, the user-feature data based on the rating data and the manipulated social network data.

In a second implementation, a non-transitory, computer-readable medium storing one or more instructions executable by a computer system to perform operations including: identifying, by an item rating and recommendation platform, rating data including respective ratings of a number of items with respect to a number of users; identifying, by the item rating and recommendation platform, user-feature data including a number of user features contributing to the respective ratings of the number of items with respect to the number of users; receiving, from a social network platform by the item rating and recommendation platform via a secret sharing scheme with a trusted initializer, manipulated social network data computed based on social network data and first input data from the trusted initializer, wherein the social network data indicate social relationships between any two of the number of users, wherein, in the secret sharing scheme with the trusted initializer, the social network platform shares with the item rating and recommendation platform the manipulated social network data without disclosing the social network data; and updating, by the item rating and recommendation platform, the user-feature data based on the rating data and the manipulated social network data.

In a third implementation, a computer-implemented system, including: one or more computers; and one or more computer memory devices interoperably coupled with the one or more computers and having tangible, non-transitory, machine-readable media storing instructions, that when executed by the one or more computers, perform operations including: identifying, by an item rating and recommendation platform, rating data including respective ratings of a number of items with respect to a number of users; identifying, by the item rating and recommendation platform, user-feature data including a number of user features contributing to the respective ratings of the number of items with respect to the number of users; receiving, from a social network platform by the item rating and recommendation platform via a secret sharing scheme with a trusted initializer, manipulated social network data computed based on social network data and first input data from the trusted initializer, wherein the social network data indicate social relationships between any two of the number of users, wherein, in the secret sharing scheme with the trusted initializer, the social network platform shares with the item rating and recommendation platform the manipulated social network data without disclosing the social network data; and updating, by the item rating and recommendation platform, the user-feature data based on the rating data and the manipulated social network data.

The foregoing and other described implementations can each, optionally, include one or more of the following features:

A first feature, combinable with any of the following features, wherein, in the secret sharing scheme with the trusted initializer, the item rating and recommendation platform shares with the social network platform manipulated user-feature data without disclosing the user-feature data, and wherein the manipulated user-feature data are computed based on the user-feature data and second input data from the trusted initializer.

A second feature, combinable with any of the previous or following features, the method or the operations further including: identifying item-feature data including a number of item features contributing to the respective ratings of the number of items with respect to the number of users, wherein a product of the user-feature data and the item-feature data results in an estimate of the rating data; and updating the item-feature data based on the rating data and the user-feature data.

A third feature, combinable with any of the previous or following features, the method or the operations further including: generating predicted rating data of the number of items with respect to the number of users based on the product of the user-feature data and the item-feature data; and generating a recommendation of a particular item for a particular user based on the predicted rating data.

A fourth feature, combinable with any of the previous or following features, wherein updating the user-feature data includes solving an optimization problem to minimize a weighted sum of a difference between the predicted rating data and rating data, the user-feature data weighted by the social network data, and an overfitting-preventing term.

A fifth feature, combinable with any of the previous or following features, wherein solving an optimization problem including solving the following equation:

$$\underset{U_i, V_j}{\operatorname{argmin}} L = \sum_{u_i \in u, v_j \in v} (R_{ij} - U_i^T V_j)^2 + \lambda_1 \sum_{u_i, u_k \in u} S_{ik}(U_i - U_k)^2 + \lambda_2 \left( \left\| \sum_{u_i \in u} U_i \right\|^2 + \left\| \sum_{v_j \in v} V_i \right\|^2 \right),$$

wherein: $U_i$ represents a vector of the user-feature data corresponding to user i; $V_j$ represents a vector of the item-feature data corresponding to item j; $R_{ij}$ represents a rating of item j by user i; $S_{ik}$ represents a social relationship between user i and user k; $\lambda_1$ represents a predefined weight associated with the social network data; and $\lambda_2$ represents a predefined weight to prevent overfitting.

A sixth feature, combinable with any of the previous or following features, wherein updating the user-feature data includes computing a product of the user-feature data and the social network data by computing a sum of the manipulated user-feature data and the manipulated social network data.

A seventh feature, combinable with any of the previous or following features, the method or the operations further including: further comprising, in the secret sharing scheme with the trusted initializer: obtaining, by the item rating and recommendation platform, the second input data from the trusted initializer; generating, by the item rating and recommendation platform, first manipulated user-feature data based on the user-feature data and the second input data from the trusted initializer; transmitting, by the item rating and recommendation platform to the social network platform, first manipulated user-feature data; receiving, by the item rating and recommendation platform from the social network platform, first manipulated social network data computed based on the social network data and first input data from the trusted initializer; generating, by the item rating and recommendation platform, a plurality of intermediate data based on two or more of the first manipulated user-feature data, the first manipulated social network data, or the second input data from the trusted initializer; transmitting, by the item rating and recommendation platform to the social network platform, plurality of intermediate data; receiving, by the item rating and recommendation platform from the social network platform, a plurality of intermediate social network data computed based on two or more of the first manipulated user-feature data, the first manipulated social network data, or the first input data from the trusted initializer; and generating, by the item rating and recommendation platform, the manipulated user-feature data based on two or more of the plurality of intermediate data, the plurality of intermediate social network data, or the second input data from the trusted initializer.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/-R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a number of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software item or packaged into multiple software items.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
identifying, by an item rating and recommendation platform, rating data comprising respective ratings of a plurality of items with respect to a plurality of users;
identifying, by the item rating and recommendation platform, user-feature data comprising a plurality of user features contributing to the respective ratings of the plurality of items with respect to the plurality of users, wherein the user-feature data is representable in a first matrix;
receiving, from a social network platform by the item rating and recommendation platform via a secret sharing scheme with a trusted initializer, manipulated social network data computed based on social network data and first input data from the trusted initializer, wherein the social network data is representable in a second matrix and indicates social relationships between any two of the plurality of users, wherein, in the secret sharing scheme with the trusted initializer, the social network platform shares with the item rating and recommendation platform the manipulated social network data without disclosing the social network data; and
updating, by the item rating and recommendation platform, the user-feature data based on the rating data and the manipulated social network data, wherein updating the user-feature data comprises computing a matrix product of the first matrix and the second matrix by computing a sum of manipulated user-feature data and the manipulated social network data.

2. The computer-implemented method of claim 1, wherein, in the secret sharing scheme with the trusted initializer, the item rating and recommendation platform shares with the social network platform the manipulated user-feature data without disclosing the user-feature data, and wherein the manipulated user-feature data are computed based on the user-feature data and second input data from the trusted initializer.

3. The computer-implemented method of claim 2, further comprising, in the secret sharing scheme with the trusted initializer:
obtaining, by the item rating and recommendation platform, the second input data from the trusted initializer;
generating, by the item rating and recommendation platform, first manipulated user-feature data based on the user-feature data and the second input data from the trusted initializer;
transmitting, by the item rating and recommendation platform to the social network platform, first manipulated user-feature data;
receiving, by the item rating and recommendation platform from the social network platform, first manipulated social network data computed based on the social network data and first input data from the trusted initializer;
generating, by the item rating and recommendation platform, a plurality of intermediate data based on two or more of the first manipulated user-feature data, the first manipulated social network data, or the second input data from the trusted initializer;
transmitting, by the item rating and recommendation platform to the social network platform, plurality of intermediate data;
receiving, by the item rating and recommendation platform from the social network platform, a plurality of intermediate social network data computed based on two or more of the first manipulated user-feature data, the first manipulated social network data, or the first input data from the trusted initializer; and
generating, by the item rating and recommendation platform, manipulated user-feature data based on two or more of the plurality of intermediate data, the plurality of intermediate social network data, or the second input data from the trusted initializer.

4. The computer-implemented method of claim 1, wherein the manipulated user-feature data and the manipulated social network data are represented in a matrix form, respectively.

5. The computer-implemented method of claim 1, further comprising:
identifying item-feature data comprising a plurality of item features contributing to the respective ratings of the plurality of items with respect to the plurality of users, wherein a product of the user-feature data and the item-feature data in an estimate of the rating data; and
updating the item-feature data based on the rating data and the user-feature data.

6. The computer-implemented method of claim 5, further comprising:
generating predicted rating data of the plurality of items with respect to the plurality of users based on the product of the user-feature data and the item-feature data; and
generating a recommendation of a particular item for a particular user based on the predicted rating data.

7. The computer-implemented method of claim 6, wherein updating the user-feature data comprises solving an optimization problem to minimize a weighted sum of a difference between the predicted rating data and rating data, the user-feature data weighted by the social network data, and an overfitting-preventing term.

8. The computer-implemented method of claim 7, wherein solving an optimization problem comprises solving:

$$\operatorname*{argmin}_{U_i, V_j} L = \sum_{u_i \in u, v_j \in v} (R_{ij} - U_i^T V_j)^2 + \lambda_1 \sum_{u_i, u_k \in u} S_{ik}(U_i - U_k)^2 + \lambda_2 \left( \left\| \sum_{u_i \in u} U_i \right\|^2 + \left\| \sum_{v_j \in v} V_i \right\|^2 \right),$$

wherein:
$U_i$ represents a vector of the user-feature data corresponding to user i;
$V_j$ represents a vector of the item-feature data corresponding to item j;
$R_{ij}$ represents a rating of item j by user i;
$S_{ik}$ represents a social relationship between user i and user k;
$\lambda_1$ represents a predefined weight associated with the social network data; and
$\lambda_2$ represents a predefined weight to prevent overfitting.

9. A non-transitory, computer-readable medium storing one or more instructions executable by a computer system to perform operations comprising:
identifying, by an item rating and recommendation platform, rating data comprising respective ratings of a plurality of items with respect to a plurality of users;

identifying, by the item rating and recommendation platform, user-feature data comprising a plurality of user features contributing to the respective ratings of the plurality of items with respect to the plurality of users, wherein the user-feature data is representable in a first matrix;

receiving, from a social network platform by the item rating and recommendation platform via a secret sharing scheme with a trusted initializer, manipulated social network data computed based on social network data and first input data from the trusted initializer, wherein the social network data is representable in a second matrix and indicates social relationships between any two of the plurality of users, wherein, in the secret sharing scheme with the trusted initializer, the social network platform shares with the item rating and recommendation platform the manipulated social network data without disclosing the social network data; and updating, by the item rating and recommendation platform, the user-feature data based on the rating data and the manipulated social network data, wherein updating the user-feature data comprises computing a matrix product of the first matrix and the second matrix by computing a sum of manipulated user-feature data and the manipulated social network data.

10. The non-transitory, computer-readable medium of claim 9, wherein, in the secret sharing scheme with the trusted initializer, the item rating and recommendation platform shares with the social network platform the manipulated user-feature data without disclosing the user-feature data, and wherein the manipulated user-feature data are computed based on the user-feature data and second input data from the trusted initializer.

11. The non-transitory, computer-readable medium of claim 10, the operations further comprising, in the secret sharing scheme with the trusted initializer:

obtaining, by the item rating and recommendation platform, the second input data from the trusted initializer;

generating, by the item rating and recommendation platform, first manipulated user-feature data based on the user-feature data and the second input data from the trusted initializer;

transmitting, by the item rating and recommendation platform to the social network platform, first manipulated user-feature data;

receiving, by the item rating and recommendation platform from the social network platform, first manipulated social network data computed based on the social network data and first input data from the trusted initializer;

generating, by the item rating and recommendation platform, a plurality of intermediate data based on two or more of the first manipulated user-feature data, the first manipulated social network data, or the second input data from the trusted initializer;

transmitting, by the item rating and recommendation platform to the social network platform, plurality of intermediate data;

receiving, by the item rating and recommendation platform from the social network platform, a plurality of intermediate social network data computed based on two or more of the first manipulated user-feature data, the first manipulated social network data, or the first input data from the trusted initializer; and generating, by the item rating and recommendation platform, manipulated user-feature data based on two or more of the plurality of intermediate data, the plurality of intermediate social network data, or the second input data from the trusted initializer.

12. The non-transitory, computer-readable medium of claim 9, wherein the manipulated user-feature data and the manipulated social network data are represented in a matrix form, respectively.

13. The non-transitory, computer-readable medium of claim 9, the operations further comprising:

identifying item-feature data comprising a plurality of item features contributing to the respective ratings of the plurality of items with respect to the plurality of users, wherein a product of the user-feature data and the item-feature data results in an estimate of the rating data; and updating the item-feature data based on the rating data and the user-feature data.

14. The non-transitory, computer-readable medium of claim 13, further comprising:

generating predicted rating data of the plurality of items with respect to the plurality of users based on the product of the user-feature data and the item-feature data; and generating a recommendation of a particular item for a particular customer based on the predicted rating data.

15. A computer-implemented system, comprising:

one or more computers; and one or more computer memory devices interoperably coupled with the one or more computers and having tangible, non-transitory, machine-readable media storing instructions, that when executed by the one or more computers, perform operations comprising:

identifying, by an item rating and recommendation platform, rating data comprising respective ratings of a plurality of items with respect to a plurality of users;

identifying, by the item rating and recommendation platform, user-feature data comprising a plurality of user features contributing to the respective ratings of the plurality of items with respect to the plurality of users, wherein the user-feature data is representable in a first matrix;

receiving, from a social network platform by the item rating and recommendation platform via a secret sharing scheme with a trusted initializer, manipulated social network data computed based on social network data and first input data from the trusted initializer, wherein the social network data is representable in a second matrix and indicates social relationships between any two of the plurality of users, wherein, in the secret sharing scheme with the trusted initializer, the social network platform shares with the item rating and recommendation platform the manipulated social network data without disclosing the social network data; and updating, by the item rating and recommendation platform, the user-feature data based on the rating data and the manipulated social network data, wherein updating the user-feature data comprises computing a matrix product of the first matrix and the second matrix by computing a sum of manipulated user-feature data and the manipulated social network data.

16. The computer-implemented system of claim 15, wherein, in the secret sharing scheme with the trusted initializer, the item rating and recommendation platform shares with the social network platform the manipulated user-feature data without disclosing the user-feature data, and wherein the manipulated user-feature data are computed based on the user-feature data and second input data from the trusted initializer, wherein the manipulated user-feature data and the manipulated social network data.

17. The computer-implemented system of claim 15, the operations further comprising:
   identifying item-feature data comprising a plurality of item features contributing to the respective ratings of the plurality of items with respect to the plurality of users, wherein a product of the user-feature data and the item-feature data results in an estimate of the rating data; and
   updating the item-feature data based on the rating data and the user-feature data.

18. The computer-implemented system of claim 17, the operations further comprising:
   generating predicted rating data of the plurality of items with respect to the plurality of users based on the product of the user-feature data and the item-feature data; and
   generating a recommendation of a particular item for a particular customer based on the predicted rating data.

19. The computer-implemented system of claim 18, wherein updating the user-feature data comprises solving an optimization problem to minimize a weighted sum of a difference between the predicted rating data and rating data, the user-feature data weighted by the social network data, and an overfitting-preventing term.

20. The computer-implemented system of claim 19, wherein solving an optimization problem comprises solving:

$$\operatorname*{argmin}_{U_i, V_j} L = \sum_{u_i \in u, v_j \in v} (R_{ij} - U_i^T V_j)^2 + \lambda_1 \sum_{u_i, u_k \in u} S_{ik} (U_i - U_k)^2 + \lambda_2 \left( \left\| \sum_{u_i \in u} U_i \right\|^2 + \left\| \sum_{v_j \in v} V_i \right\|^2 \right),$$

wherein:
   $U_i$ represents a vector of the user-feature data corresponding to user i;
   $V_j$ represents a vector of the item-feature data corresponding to item j;
   $R_{ij}$ represents a rating of item j by user i;
   $S_{ik}$ represents a social relationship between user i and user k;
   $\lambda_1$ represents a predefined weight associated with the social network data; and
   $\lambda_2$ represents a predefined weight to prevent overfitting.

* * * * *

UNITED STATES PATENT AND TRADEMARK OFFICE
CERTIFICATE OF CORRECTION

PATENT NO. : 10,672,058 B2  
APPLICATION NO. : 16/390057  
DATED : June 2, 2020  
INVENTOR(S) : Chaochao Chen and Jun Zhou Page 1 of 1

It is certified that error appears in the above-identified patent and that said Letters Patent is hereby corrected as shown below:

In the Specification

Column 6 / Line 55 – Please delete "B1" and insert -- B2 --, therefor.

Column 6 / Line 56 – Please delete "B1" and insert -- B2 --, therefor.

Column 6 / Line 58 – Please delete "B2 and Y2 such that E2=B2-Y2." and insert -- B1 and Y2 such that E2=B1-Y2 --, therefor.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*